United States Patent [19]

Henry, Jr. et al.

[11] 4,381,355

[45] Apr. 26, 1983

[54] RESORCINOL POLYMER BONDED TAPHOLE MIX AND SPECIALTY MATERIALS

[75] Inventors: Francis W. Henry, Jr., Glen Burnie; Henry E. Anthonis, III, Annapolis; Subrata Banerjee, Glen Burnie, all of Md.

[73] Assignee: General Refractories Company, Bala Cynwyd, Pa.

[21] Appl. No.: 254,777

[22] Filed: Apr. 16, 1981

[51] Int. Cl.$^3$ .......................... C08K 3/34; C08K 3/04; C08K 3/06

[52] U.S. Cl. ...................................... 523/140; 501/94; 524/356; 524/386; 524/418; 524/424; 524/445; 524/446

[58] Field of Search .................... 260/29.2 R, 29.2 M, 260/31.4 R, 32.8 R, 33.4 R, 33.2 R; 525/390, 343, 3; 523/140; 524/356, 386, 418, 424, 445, 446

[56] References Cited

U.S. PATENT DOCUMENTS

| | | | |
|---|---|---|---|
| 3,707,414 | 12/1972 | Wismer | 260/38 |
| 3,717,602 | 2/1973 | Koch | 260/38 |
| 3,917,558 | 11/1975 | Gardikes | 260/38 |
| 4,022,739 | 5/1977 | Bove | 260/37 EP |
| 4,261,878 | 4/1981 | Hirose | 260/38 |

*Primary Examiner*—C. A. Henderson
*Attorney, Agent, or Firm*—Brian G. Brunsvold; Charles E. Lipsey; Everett H. Murray, Jr.

[57] ABSTRACT

A non-aqueous taphole mix comprising a binder, a non-aqueous solvent for the binder and a refractory filler, the binder comprising a mixture of polymers formed by the homopolymerization of resorcinol and a hardening agent. Also disclosed are carbon-containing specialties comprising a binder, a solvent for the binder, and a refractory filler, the binder comprising a mixture of polymers formed by the homopolymerization of resorcinol and a hardening agent.

20 Claims, No Drawings

RESORCINOL POLYMER BONDED TAPHOLE MIX AND SPECIALTY MATERIALS

BACKGROUND OF THE INVENTION

The invention relates generally to refractory compositions. More specifically, the invention relates to refractory compositions suitable for closing the tapholes of blast furnaces and the like and to specialty compositions such as plastic and ramming mixes.

In the past, compositions for plugging the tapholes of blast furnaces, as well as refractory carbon-containing specialty compositions such as plastic, ramming mixes, gunning mixes and mortars, have generally contained a refractory filler and a carbonizable binding material. Coal tar has previously been employed as such a binding material and continues to represent one of the most economical binding agents. However, in both taphole plugging and specialty applications, coal tar bonded refractory compositions have been recognized as generating substantial quantities of noxious fumes during firing. These fumes pose air contamination and occupational health hazards and have been recognized as carcinogenic.

Efforts have been made in the past to replace the coal tar binding materials. For example, U.S. Pat. No. 4,072,531 issued to Funabiki et al. discloses a blast furnace taphole plugging composition including, inter alia, a lignin-modified phenolformaldehyde condensation product as a replacement for some or all of the tar binding material. In reference to prior art efforts to substitute conventional phenolic resins for the coal tar binder in similar compositions, Funabiki et al. notes that conventional phenolic resins solidify prematurely in the applicator and are disadvantageously expensive.

U.S. Pat. No. 4,022,739, issued to Bove also discloses a binder for taphole plugging compositions which does not generate noxious fumes to the degree experienced with coal tar. The binder of Bove comprises a mixture of a high boiling hydrocarbon derivative and a synthetic resin, which may be a formo-phenolic resin having resorcinol moecules in the polymer chain. In this regard, the use of resorcinol-formaldehyde polymers as temporary binders for refractory materials is well-known. U.S. Pat. No. 3,007,805, issued to Cline and U.S. Pat. No. 2,938,807, issued to Andersen both disclose the use of phenol-formaldehyde and resorcinol-formaldehyde resins as carbonizable binders for refractory bodies.

Use of phenol-formaldehyde and resorcinol-formaldehyde polymers as the binding material in non-aqueous taphole mix compositions and refractory specialties does not entirely solve the fume problem. More specifically, these polymers commonly contain free formaldehyde. As noted in U.S. Pat. No. 3,917,558 issued to Gardikes et al., the formaldehyde vapors generated during curing are unpleasant, irritating and pose a health hazard to persons continually exposed to such vapors. Moreover, these polymers may contain 5–10% free phenol, which may also vaporize during curing and thus generate toxic fumes. With respect to refractory specialties in particular, the fumes from organic solvents employed with prior art synthetic resin binders were hazardous to both manufacturing employees and employees using the specialty material.

SUMMARY OF THE INVENTION

The present invention overcomes many of the problems hitherto associated with the use of coal tar binders in non-aqueous taphole plugging mix compositions and in carbon-containing refractory specialty materials, as well as many of the problems associated with the use of conventional formophenolic resins as substitute binders in such materials, by employing a binder comprising a mixture of polymers formed by the homopolymerization of resorcinol and a hardening agent. The polymeric resorcinol binders employed in accordance with the present invention are non-carcinogenic, do not produce noxious vapors to the extent experienced with coal tar, do not contain free formaldehyde, and contain less free monomeric phenolic materials than many prior art synthetic resin binding materials. With respect to the carbon-containing specialty materials in particular, the binders employed in the present invention eliminate the need for organic solvents and thereby reduce hazards associated with handling of these materials.

Additional objects and advantages of the invention will be set forth in part in the description which follows, and in part will be obvious from the description, or may be learned from the practice of the invention. The objects and advantages of the invention may be realized and attained by means of the instrumentalities and combinations particularly pointed out in the appended claims.

To achieve the objects and in accordance with the purpose of the invention, as embodied and broadly described herein, a non-aqueous taphole mix in accordance with the present invention comprises a binder, a non-aqueous solvent for the binder and a refractory filler, the binder comprising a mixture of polymers formed by the homopolymerization of resorcinol and a hardening agent. Typically, the mixture of polymers formed by the homopolymerization of resorcinol will comprise up to about 20% resorcinol, about 5–30% isomers of dihydroxydiphenyl, about 10–45% isomers of trihydroxydiphenyl, and the balance being higher polymers of resorcinol. The binders employed in the present invention are non-carcinogenic and are typically thermoplastic, having a softening temperature of about 80° C. The binder is typically present in the taphole mix of the present invention in amounts of about 5–20 parts by weight per 100 parts of refractory filler.

Carbon-containing specialty materials in accordance with the present invention comprise a binder, a solvent for the binder and a refractory filler, the binder comprising a mixture of polymers formed by the homopolymerization of resorcinol and a hardening agent. Carbon-containing specialties in accordance with the present invention, such as ramming and plastic mixes, may employ either aqueous solvents or non-aqueous solvents such as alcohols and ketones.

The binders employed in either the taphole mixes or the specialties in accordance with the present invention may include as hardening agents lignosulphonate, sulphur, tris(hydroxymethyl)-nitromethane, hexamethylene tetramine, hexamethoxymethylmelamine, urea formaldehyde concentrate, paraformaldehyde, or other methylene donors.

DESCRIPTION OF THE PREFERRED EMBODIMENTS

Reference will now be made in detail to the presently preferred embodiments of the invention, which together with the following examples, serve to explain the principles of the invention. As above noted, non-aqueous taphole mixes in accordance with the present invention comprise a binder, a non-aqueous solvent for the binder and a refractory filler. Similarily, carbon-containing specialty materials in accordance with the present invention comprise a binder, a solvent for the binder, and a refractory filler. In both instances, the binder comprises a mixture of polymers formed by the homopolymerization of resorcinol and a hardening agent.

The polymeric resorcinol materials useful in accordance with the present invention may be formed by heating monomeric resorcinol to temperatures above about 200° C. For example, suitable polymeric resorcinol materials are formed as a solid resinous still residue remaining after the distillation of technical grade resorcinol. Residues of this type are described in detail in U.S. Pat. No. 3,816,145, issued to Melcher, as well as U.S. Pat. No. 3,133,033 issued to St. Clair, and U.S. Pat. No. 3,343,884 issued to Voris.

Preferred polymeric resorcinol binding materials useful in accordance with the present invention comprise up to about 20% resorcinol, about 5–30% isomers of dihydroxydiphenyl, about 10–45% isomers of trihydroxydiphenyl, and the balance being higher polymers of resorcinol. Particularly preferred polymeric resorcinol materials useful as binders in accordance with the present invention comprise about 2–8% resorcinol, about 12–20% isomers of dihydroxydiphenyl, about 10–45% isomers of trihydroxydiphenyl and the balance being higher polymers of resorcinol. A composition corresponding to this particularly preferred material is commercially available from Koppers Company, Inc., Pittsburgh, Pa., under the trade designation, "Penacolite Resin RM-441." These particularly preferred materials have a lower percentage of free monomeric phenolic constitutents than conventional phenolic resins, the latter having typically 5–10% free phenol compared with 2–8% free resorcinol in the former. Even in like concentrations, resorcinol monomer is much less toxic than phenol monomer. The reduction in monomeric constitutents, and the elimination of phenol, are particularly advantageous in reducing the amount of toxic vapor given off during use of the compositions of the present invention.

The binder is typically a thermoplastic material, solid at room temperature, with a softening temperature of about 80° C. The more reactive portions of the polymer are monomeric resorcinol and isomers of dihydroxydiphenyl and trihydroxydiphenyl.

The hardening agents employed with the binders for either the taphole mixes or carbon-containing specialty materials of the present invention may include lignosulphonate; sulphur; nitroalcohols, such as tris-(hydroxymethyl)-nitromethane; amines, such as hexamethylene tetramine and hexamethoxymethylmelamine; urea formaldehyde concentrates; paraformaldehyde; or other methylene donors. Preferred hardening agents for use in accordance with the present invention are selected from the group consisting of lignosulphonate, sulphur, tris-(hydroxymethyl)-nitromethane, hexamethylene tetramine, hexamethoxymethylmelamine, urea-formaldehyde concentrates, para-formaldehyde and other methylene donors.

Nitroalcohols, such as tris-(hydroxymethyl)-nitromethane, are particularly preferred because of their high decomposition temperature and the marked plasticizing effect they have on the mixture at temperatures below that decomposition temperature. Tris-(hydroxymethyl)-nitromethane, for example, decomposes at about 175° C. to provide methylene for hardening the polymer yet can plasticize the mix at lower temperatures.

Unlike prior art materials containing formo-phenolic binding materials, the taphole mixes and carbon-containing specialty materials of the present invention do not contain large quantities of free formaldehyde and, therefore, avoid the health hazards hitherto experienced with the generation of formaldehyde vapors in prior art materials. Most significantly, however, the binding materials of the present invention are non-carcinogenic and provide a distinct improvement over coal tar binders of the prior art in this regard. Further, the polymeric resorcinol binding materials of the present invention are significantly less expensive than conventional formo-phenolic resins employed as a substitute for coal tar in the prior art.

Solvents useful in the non-aqueous taphole mixes and carbon-containing specialty materials of the present invention may be any of those previously employed in the prior art or otherwise known to be suitable for the polymeric resorcinol binders of the present invention. Preferred solvents are selected from the group consisting of cellosolve, cellosolve acetate, ethylene glycol, isopropyl alcohol, polyethylene glycol and mixtures thereof. Also suitable for use in the present invention are other alcoholic solvents or ketone solvents.

The refractory filler materials employed in the taphole mixes and specialty materials of the present invention can be any of those normally employed for such purposes in the prior art. These materials include, but are not limited to, high density silicious sand, chamotte, corundum, magnesia, dolomite, silicon carbide, bauxite, mullite, sillimanite, soft coal, hard coal, coke dust, graphite, coke breeze, calcined fireclay, pyrophyllite, ball clay, ferrosilicon, alumino-silicates, mixtures thereof, etc.

With respect to the non-aqueous taphole mixes of the present invention, the binder comprising a mixture of polymers formed by the homopolymerization of resorcinol will typically be present in amounts of about 5–20 parts by weight per 100 parts of refractory filler. The non-aqueous solvent is typically present in amounts of about 3–15 parts by weight per 100 parts of refractory filler, while the hardening agent is typically present in amounts of about 0.1–0.5 parts by weight per 100 parts of refractory filler. It is to be understood, however, that the selection of suitable proportions of materials for application of the teachings of the present invention to a specific problem or environment will be within the capabilities of one having ordinary skill in the art in light of the teachings contained herein.

With respect to the carbon-containing specialty materials of the present invention, a resorcinol polymer binder as above-described is used in plastic, ramming mixes and similar compositions that contain carbon. The proportion of ingredients may be varied to alter the flowability and curing time of the mix, depending on the needs of the particular application. Such modification and variation will be within the capabilities of one having ordinary skill in the art in light of the teachings contained herein. Specialty materials within the scope of the present invention include refractories that cure to form monolithic, integral structures after application of the sort generally known in the art as plastics, ramming mixes, gunning mixes and mortars.

A particular advantage of the specialty materials formed in accordance with the present invention is that they may employ an aqueous solvent. Use of an aqueous solvent eliminates noxious or toxic vapors and fire or explosion threats attendant upon the use of many organic solvents hitherto employed in specialty applications. A particularly preferred binder may be a 65% be weight solids solution in water. It is to be understood, however, that binders for specialties in accordance with the present invention may also be in alcoholic or ketone solution.

In specialty materials of the present invention, the polymeric resorcinol binder may be employed with alumino-silicate materials with or without graphite, silicon carbide, etc. In the case of basic plastic or ramming mix compositions with or without graphite, silicon carbide, etc., the binder can be aqueous or non-aqueous as noted above.

An example of a non-aqueous taphole mix in accordance with the present invention appears in Example 1.

EXAMPLE 1

| Composition, Weight % | |
|---|---|
| Coke Breeze, (coarse) | 20.0 |
| Pyrophyllite, (fine) | 10.0 |
| Calcined Fireclay, (intermediates) | 25.0 |
| Silicon Carbide, (fine) | 15.0 |
| Ball Clay | 28.0 |
| Ferrosilicon, (fine) | 2.0 |
| Resorcinol Polymer, (ADDED) | 5–20 |
| Cellosolve, (ADDED) | 2–10 |
| Hexamethylene Tetramine, (ADDED) | 0.1–0.5 |
| Polyethylene Glycol, (ADDED) | 1–5 |

Examples of carbon-containing specialty materials in accordance with the present invention and comparisons thereof with similar materials containing coal tar and formo-phenolic binder systems appear in Tables 1 and 2.

TABLE 1

Comparative Physical Properties of Conventional vs. Resorcinol Polymer Bonded Ramming Mixes

| | I | II |
|---|---|---|
| Composition Range, Weight Percent | | |
| Calcined, S.A. Bauxite | 50–80 | 50–80 |
| Calcined Alumina | 2–15 | 2–15 |
| Ball Clay | 6–10 | 6–10 |
| Silicon Carbide Fines | 14–22 | 14–22 |
| Graphite Fines (ADDED) | 4–12 | 4–12 |
| Others (ADDED) | 2–10 | 2–10 |
| Dry Lignosulphonate (ADDED) | 1–3 | — |
| Resorcinol Polymer Blend (Penocolite Resin RM-441) (ADDED) | — | 5.5 |
| Hardener | — | 1.0 |
| Physical Properties: | | |
| Bulk Density after 24h at 230° F. (110° C.) | | |
| lb/ft$^3$ | 163.9 | 166.1* |
| Mg/m$^3$ | 2.63 | 2.66* |
| CMOR after 24h at 230° F. (110° C.), psi | 360 | 870* |
| MPa | 2.5 | 6.0* |
| Open Porosity after 24h at 230° F. (110° C.), % | 19.4 | 18.6 |
| Reheat Properties after 5h at 2700° F. (1480° C.) Reducing Atmosphere | | |
| Bulk Density, lb/ft$^3$ | 159.8 | 163.1 |
| Mg/m$^3$ | 2.56 | 2.62 |
| Linear Change, % | +0.5 | +0.2 |
| Volume change, % | +2.7 | +1.5 |
| CMOR, psi | 1080 | 1740 |

TABLE 1-continued

Comparative Physical Properties of Conventional vs. Resorcinol Polymer Bonded Ramming Mixes

| | I | II |
|---|---|---|
| MPa | 7.4 | 12.0 |
| Open Porosity, % | 18.5 | 15.9 |
| Hot Modulus of Rupture at 2700° F. (1480° C.) Reducing Atmosphere, psi | 495 | 645 |
| MPa | 3.4 | 4.4 |
| Hot Modulus of Rupture after 30 minutes at 2700° F. (1480° C.) Reducing Atmosphere, psi | 445 | 620 |
| MPa | 3.1 | 4.3 |

*Dried at 450° F. (230° C.)

TABLE 2

Comparative Physical Properties: Phenol Formaldehyde Bonded Ramming Mix vs. Resorcinol Polymers Bonded Ramming Mix

| | A<br>Fused Al$_2$O$_3$ Based SiC Containing Graphitic Phenol Formaldehyde Bonded Ramming Mix | B<br>Composition Similar to A but with Resorcinol Polymer Bond |
|---|---|---|
| Bulk Density after 24 h at 450° F. (230° C.), | | |
| lb/ft$^3$ | 188 | 182.4 |
| Mg/m$^3$ | 3.01 | 2.92 |
| CMOR after 24h at 450° F. (230° C.), psi | 1010 | 2050 |
| MPa | 7.0 | 14.1 |
| Reheat Properties after 5h at 2700° F. (1480° C.) Reducing Atmosphere | | |
| Bulk Density, lb/ft$^3$ | 184.1 | 180.2 |
| Mg/m$^3$ | 2.95 | 2.89 |
| Linear Change, % | +0.4 | +0.2 |
| Volume Change, % | +0.4 | +0.2 |
| CMOR, psi | 1050 | 1810 |
| MPa | 7.2 | 12.5 |
| HMOR at 2700° F. (1480° C.) Reducing Atmosphere | | |
| psi | 555 | 380 |
| MPa | 3.8 | 2.6 |

While the hot modulus of rupture listed for Example "A" in Table 2 (phenol-formaldehyde binder) is somewhat higher than that for Example "B" (resorcinol polymer binder), it has been known that, to expect optimum performance in blast furnace troughs, a certain minimum value of hot modulus of rupture should be attained. In both cases, the minimum value has been exceeded. No advantage would be gained by even a significant increase in hot modulus of rupture once the empirically obtained minimum has been exceeded. The performance of these two materials would then be considered to be comparable.

It will be apparent to those skilled in the art that various modifications and variations can be made in the non-aqueous taphole mix and carbon-containing specialty materials in accordance with the present invention. Thus, it is intended that the present invention cover the modifications and variations of this invention provided that they come within the scope of the appended claims and their equivalents.

What is claimed is:

1. A non-aqueous taphole mix comprising a binder, a non-aqueous solvent for the binder and a refractory filler, said binder comprising a mixture of polymers formed by the homopolymerization of resorcinol and a hardening agent, said mixture of polymers formed by the homopolymerization of resorcinol comprising about 2-8% resorcinol, about 12-20% isomers of dihydroxydiphenyl, about 10-45% isomers of trihydroxydiphenyl, and the balance being higher polymers of resorcinol, and said hardening agent being selected from the group consisting of lignosulphonate, sulphur, tris-(hydroxymethyl)-nitromethane, hexamethylene tetramine, or hexamethoxymethylmelamine.

2. A non-aqueous taphole mix as defined in claim 1 wherein said binder is non-carcinogenic.

3. A non-aqueous taphole mix as defined in claim 1 wherein said binder is thermoplastic and has a softening temperature of about 80° C.

4. A non-aqueous taphole mix as defined in claim 1, wherein said solvent is selected from the group consisting of cellosolve, cellosolve acetate, ethylene glycol, isoproply alcohol, polyethylene glycol and mixtures thereof.

5. A non-aqueous taphole mix as defined in claim 1 wherein said solvent is an alcoholic solvent or a ketone solvent.

6. A non-aqueous taphole mix as defined in claim 1 wherein said binder is present in amounts of about 5-20 parts by weight per 100 parts of refractory filler.

7. A non-aqueous taphole mix as defined in claim 4 wherein said solvent is present in amounts of about 3-15 parts by weight per 100 parts of refractory filler.

8. A non-aqueous taphole mix as defined in claim 5 wherein said solvent is present in amounts of about 3-15 parts by weight per 100 parts of refractory filler.

9. A non-aqueous taphole mix as defined in claim 1 wherein said hardening agent is present in amounts of about 0.1-0.5 parts by weight per 100 parts of refractory filler.

10. A non-aqueous taphole mix as defined in claim 1 wherein said refractory filler is selected from the group consisting of high density silicious sand, chamotte, corundum, magnesia, dolomite, silicon carbide, bauxite, mullite, sillimanite, soft coal, hard coal, coke dust, graphite, coke breeze, calcined fireclay, pyrophyllite, ball clay, ferrosilicon, aluminosilicates, and mixtures thereof.

11. A carbon-containing specialty comprising a binder, a solvent for the binder, and a refractory filler, said binder comprising a mixture of polymers formed by the homopolymerization of resorcinol and a hardening agent, said mixture of polymers formed by the homopolymerization of resorcinol comprising about 2-8% resorcinol, about 12-20% isomers of dihydroxydiphenyl, about 10-45% isomers of trihydroxydiphenyl, and the balance being higher polymers of resorcinol, and said hardening agent being selected from the group consisting of lignosulphonate, sulphur, tris-(hydroxymethyl)-nitromethane, hexamethylene tetramine, or hexamethoxymethylmelamine.

12. A carbon-containing specialty as defined in claim 11 wherein said binder is non-carcinogenic.

13. A carbon-containing specialty as defined in claim 11 wherein said binder is thermoplastic and has a softening temperature of about 80° C.

14. A carbon-containing specialty as defined in claim 11 wherein said solvent is selected from the group consisting of cellosolve, cellosolve acetate, ethylene glycol, isopropyl alcohol, polyethelene glycol and mixtures thereof.

15. A carbon-containing specialty as defined in claim 11 wherein said solvent is an aqueous solvent.

16. A carbon-containing specialty as defined in claim 6 wherein said solvent is an alcoholic solvent or a ketone solvent.

17. A carbon-containing specialty as defined in claim 11 wherein said refractory filler is selected from the group consisting of high density silicious sand, chamotte, corundum, magnesia, dolomite, silicon carbide, bauxite, mullite, sillimanite, soft coal, hard coal, coke dust, graphite, coke breeze, calcined fireclay, pyrophyllite, ball clay, ferrosilicon, aluminosilicates, and mixtures thereof.

18. A carbon-containing specialty as defined in claim 11 wherein said binder is a 65% solids aqueous solution.

19. A carbon-containing specialty as defined in claim 11 wherein said specialty is a ramming mix.

20. A carbon-containing specialty as defined in claim 11 wherein said specialty is a plastic.

* * * * *